US011879362B1

(12) United States Patent
Freeman et al.

(10) Patent No.: US 11,879,362 B1
(45) Date of Patent: Jan. 23, 2024

(54) SEGMENTED CERAMIC MATRIX COMPOSITE VANE ENDWALL INTEGRATION WITH TURBINE SHROUD RING AND MOUNTING THEREOF

(71) Applicant: Rolls-Royce Corporation, Indianapolis, IN (US)

(72) Inventors: Ted J. Freeman, Danville, IN (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/112,187

(22) Filed: Feb. 21, 2023

(51) Int. Cl.
*F01D 9/04* (2006.01)

(52) U.S. Cl.
CPC .......... *F01D 9/042* (2013.01); *F05D 2240/14* (2013.01); *F05D 2300/6033* (2013.01)

(58) Field of Classification Search
CPC ................. F01D 9/042; F05D 2240/14; F05D 2300/6033
See application file for complete search history.

(56) References Cited

U.S. PATENT DOCUMENTS

| | | | |
|---|---|---|---|
| 6,340,285 B1 | 1/2002 | Gonyou et al. | |
| 6,530,744 B2 | 3/2003 | Liotta et al. | |
| 7,798,775 B2 | 9/2010 | Kammel et al. | |
| 8,092,163 B2 | 1/2012 | Shapiro et al. | |
| 8,206,100 B2 | 6/2012 | Schuler et al. | |
| 9,546,557 B2 | 1/2017 | Grooms et al. | |
| 10,100,659 B2 * | 10/2018 | Lamusga | F01D 25/246 |
| 10,370,990 B2 | 8/2019 | Reynolds et al. | |
| 10,371,383 B2 | 8/2019 | Reynolds et al. | |
| 10,378,373 B2 | 8/2019 | Reynolds et al. | |
| 10,385,709 B2 | 8/2019 | Reynolds et al. | |
| 10,385,731 B2 * | 8/2019 | Kerns | F23R 3/60 |
| 10,385,776 B2 * | 8/2019 | Reynolds | F01D 25/24 |
| 10,450,897 B2 | 10/2019 | Gallier et al. | |
| 10,822,973 B2 * | 11/2020 | Parvis | F01D 9/041 |
| 10,961,857 B2 | 3/2021 | Whittle et al. | |
| 11,073,039 B1 * | 7/2021 | Whittle | F01D 11/08 |
| 11,143,402 B2 | 10/2021 | Noe et al. | |
| 11,149,569 B2 | 10/2021 | Reynolds et al. | |
| 11,149,575 B2 | 10/2021 | Kern et al. | |
| 11,181,005 B2 | 11/2021 | Zelesky et al. | |
| 11,268,394 B2 | 3/2022 | Frey et al. | |
| 11,286,799 B2 | 3/2022 | Shapiro et al. | |
| 11,306,617 B2 | 4/2022 | Gallier et al. | |
| 11,384,651 B2 | 7/2022 | Shapiro et al. | |
| 11,391,171 B2 | 7/2022 | Reynolds et al. | |
| 11,441,436 B2 | 9/2022 | Frey et al. | |
| 2014/0004293 A1 | 1/2014 | Grooms et al. | |
| 2018/0238184 A1 * | 8/2018 | Reynolds | F01D 9/023 |
| 2022/0390112 A1 | 12/2022 | Ganiger et al. | |
| 2022/0390114 A1 | 12/2022 | Ganiger et al. | |

* cited by examiner

*Primary Examiner* — Jesse S Bogue
(74) *Attorney, Agent, or Firm* — Barnes & Thornburg LLP

(57) ABSTRACT

A turbine section of a gas turbine engine includes a case, a plurality of flow path components, and a mounting system. The case extends circumferentially at least partway around an axis of the gas turbine engine. The plurality of flow path components includes a flow path segment and a turbine vane. The mounting system couples the flow path segment to the case to support the flow path segment radially relative to the axis of the gas turbine engine.

19 Claims, 4 Drawing Sheets

SEGMENTED CERAMIC MATRIX COMPOSITE VANE ENDWALL INTEGRATION WITH TURBINE SHROUD RING AND MOUNTING THEREOF

FIELD OF THE DISCLOSURE

The present disclosure relates generally to gas turbine engines, and more specifically to turbine sections for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over flow path components of the turbine, such as airfoils included in stationary vanes, rotating blades, and static shrouds arranged around the rotating blades. The interaction of combustion products with these components in the turbine heats the components to temperatures that require the components to be made from high-temperature resistant materials and/or to be actively cooled by supplying relatively cool air to the vanes and blades. To this end, incorporating composite materials adapted to withstand very high temperatures in the turbine may be desired. Design and manufacture of the flow path components of the turbine from composite materials presents challenges due to the geometry and strength limitations of composite materials.

SUMMARY

The present disclosure may comprise one or more of the following features and combinations thereof.

A turbine section for use with a gas turbine engine may include a case, a plurality of flow path components, and a mounting system. The case may extend circumferentially at least partway around an axis of the gas turbine engine. The plurality of flow path components may be arranged to define a primary gas path of the turbine section.

In some embodiments, the plurality of flow path components may include a turbine vane, a turbine blade, and a flow path segment. The turbine blade may be located axially aft of the turbine vane and configured to rotate about the axis of the gas turbine engine. The flow path segment may be made of ceramic matrix composite materials.

In some embodiments, the flow path segment may be formed to include a segment wall, a blade track attachment, and a forward attachment. The segment wall may extend axially between a forward end located axially forward of the turbine vane and an aft end spaced apart axially from the forward end and located axially aft of the turbine blade to define a portion of the primary gas path. The blade track attachment may extend radially outward away from the segment wall and toward the case near the aft end of the segment wall. The forward attachment may be spaced apart from the blade track attachment and located axially forward of the blade track attachment near the forward end.

In some embodiments, the turbine vane may extend radially inward from the flow path segment axially between the blade track attachment and the forward attachment of the flow path segment.

In some embodiments, the mounting system may be made of metallic materials and be configured to couple the flow path segment to the case to support the flow path segment radially relative to the axis of the gas turbine engine. The mounting system may include a blade track mount, a forward mount, and a vane mount. The blade track mount may engage the blade track attachment of the flow path segment. The forward mount may engage the forward attachment of the flow path segment. The vane mount may engage the turbine vane axially between the blade track mount and the forward mount.

In some embodiments, the forward mount may be located radially outward of the primary gas path so that the forward mount is shielded from hot combustion products flowing through the primary gas path during use of the turbine section in the gas turbine engine.

In some embodiments, the forward attachment and the forward mount may be free for axial movement relative to each other to accommodate different rates of thermal expansion experienced by the ceramic matrix composite materials of the flow path segment and the metallic materials of the mounting system.

In some embodiments, the turbine vane may be free for radial movement relative to the flow path segment to accommodate different rates of thermal expansion experienced by the ceramic matrix composite materials of the flow path segment and the metallic materials of the mounting system.

In some embodiments, the segment wall of the flow path segment may be radially aligned with a combustor liner included in the gas turbine engine. The combustor liner may be located radially inward of the forward mount so that the forward mount is shielded from hot combustion products flowing through the primary gas path.

In some embodiments, the forward mount of the mounting system may include a radially-extending mount portion and an axially-extending mount portion. The radially-extending mount portion may extend radially inward from the case toward the primary gas path. The axially-extending mount portion may extend axially aft from the radially-extending mount portion to form an L-shaped hanger.

In some embodiments, the forward attachment of the flow path segment may include a radially-extending attachment portion and an axially-extending attachment portion. The radially-extending attachment portion may extend radially outward from the segment wall of the flow path segment at the forward end of the segment wall. The axially-extending attachment portion may extend axially forward from the radially-extending attachment portion away to form an L-shaped hook that mates with the L-shaped hanger of the forward mount of the mounting system to couple the flow path segment to the case.

In some embodiments, the forward mount of the mounting system may include a clevis and a forward mount pin. The clevis may extend radially inward from the case toward the primary gas path. The clevis may be shaped to define a forward attachment receiving space that receives the forward attachment of the flow path segment. The forward mount pin may be configured to extend axially through the clevis into the forward attachment so as to couple the forward mount to the forward attachment.

In some embodiments, the forward mount of the mounting system may include a pair of hangers, a forward carrier segment, and a forward mount pin. The pair of hangers may extend radially inward from the case toward the flow path segment and axially aft toward the turbine vane. The forward carrier segment may include a forward carrier segment body and a pair of attachment hooks. The forward carrier segment body may extend circumferentially at least partway about the axis. The pair of attachment hooks may mate with the pair of the hangers to couple the forward carrier segment to the case. The forward mount pin may extend axially into the forward carrier segment body and through the forward attachment so as to couple the forward mount to the forward attachment.

In some embodiments, the blade track mount may include a pair of hangers, a carrier segment, and a retainer. The pair of hangers may extend radially inward from the case toward the flow path segment. The carrier segment may have a carrier segment body and a pair of carrier hooks. The carrier segment body may extend circumferentially at least partway about the axis. The pair of carrier hooks may mate with the pair of the hangers of the blade track mount to couple the carrier segment body to the case. The retainer may extend axially into the carrier segment body and through the blade track attachment so as to couple the blade track attachment of the flow path segment to the carrier segment body.

In some embodiments, the blade track attachment may include a first attachment flange and a second attachment flange. The first attachment flange may extend radially outward away from the segment wall. The second attachment flange may be spaced apart axially from the first attachment flange. The second attachment flange may extend radially outward away from the segment wall. The retainer may extend axially into the carrier segment body and through the first attachment flange and the second attachment flange of the blade track attachment.

In some embodiments, the forward mount of the mounting system includes a radially-extending mount portion and an axially-extending mount portion. The radially-extending mount portion may extend radially inward from the case toward the primary gas path. The axially-extending mount portion may extend axially aft from the radially-extending mount portion to form an L-shaped hanger. The forward attachment may include a radially-extending attachment portion and an axially-extending attachment portion. The radially-extending attachment portion may extend radially outward from the segment wall of the flow path segment at the forward end of the segment wall. The axially-extending attachment portion may extend axially forward from the radially-extending attachment portion away to form an L-shaped hook that mates with the L-shaped hanger of the forward mount of the mounting system to couple the flow path segment to the case.

In some embodiments, the forward mount of the mounting system may include a clevis and a forward mount pin. The clevis may extend radially inward from the case toward the primary gas path. The clevis may be shaped to define a forward attachment receiving space that receives the forward attachment of the flow path segment. The forward mount pin may be configured to extend axially through the clevis into the forward attachment so as to couple the forward mount to the forward attachment.

According to another aspect of the present disclosure, a turbine section for use with a gas turbine engine may include a case, a flow path segment, and a mounting system. The case may extend circumferentially at least partway around an axis of the gas turbine engine. The flow path segment may be made of ceramic matrix composite materials and arranged to define a primary gas path of the turbine section.

In some embodiments, the flow path segment may include a segment wall, a first attachment, and a second attachment. The segment wall may extend axially between a forward end and an aft end spaced apart from the forward end to define a portion of the primary gas path. The first attachment may extend radially outward away from the segment wall and toward the case. The second attachment may be located axially forward of the first attachment.

In some embodiments, the mounting system may be made of metallic materials and may be configured to couple the flow path segment to the case to support the flow path segment radially relative to the axis. The mounting system may include a first mount and a second mount. The first mount may be configured to engage the first attachment of the flow path segment. The second mount may be located axially forward of the first attachment and configured to engage the second attachment of the flow path segment.

In some embodiments, the second mount may be located radially outward of the primary gas path so that the second mount is shielded from hot combustion products flowing through the primary gas path during use of the turbine section in the gas turbine engine. The second attachment and the second mount may be free for axial movement relative to each other to accommodate different rates of thermal expansion experienced by the ceramic matrix composite materials of the flow path segment and the metallic materials of the mounting system.

In some embodiments, the turbine section may further include a turbine vane. The turbine vane may extend radially inward from the flow path segment axially between the first and second attachments of the flow path segment. The mounting system may further include a third mount located axially between the first and second mounts of the mounting system and configured to engage the turbine vane.

In some embodiments, the flow path segment and the turbine vane may be free for radial movement relative each other to accommodate different rates of thermal expansion experienced by the ceramic matrix composite materials of the flow path segment and the metallic materials of the mounting system.

In some embodiments, the second mount of the mounting system may include a pair of hangers, a carrier segment, and a second mount pin. The pair of hangers may extend radially inward from the case toward the flow path segment. The carrier segment may have a carrier segment body and a pair of attachment hooks. The carrier segment body may extend circumferentially at least partway about the axis. The pair of attachment hooks may mate with the pair of the hangers to couple the carrier segment to the case. The second mount pin may extend axially into the carrier segment body and through the second attachment so as to couple the second attachment of the flow path segment to the carrier segment of the second mount.

In some embodiments, the second mount of the mounting system may include a radially-extending mount portion and an axially-extending mount portion. The radially-extending mount portion may extend radially inward from the case toward the primary gas path. The axially-extending mount portion may extend axially aft from the radially-extending mount portion to form an L-shaped hanger. The second attachment may include a radially-extending attachment portion and an axially-extending attachment portion. The radially-extending attachment portion may extend radially outward from the segment wall of the flow path segment at the forward end of the segment wall. The axially-extending attachment portion may extend axially forward from the radially-extending attachment portion away from the third mount to form an L-shaped hook that mates with the L-shaped hanger of the second mount of the mounting system to couple the flow path segment to the case.

In some embodiments, the second mount of the mounting system may include a clevis and a second mount pin. The clevis may extend radially inward from the case toward the primary gas path. The clevis may be shaped to define a second attachment receiving space that receives the second attachment of the flow path segment. The second mount pin may be configured to extend axially through the clevis into the second attachment so as to couple the second mount to the second attachment.

In some embodiments, the first mount may include a pair of hangers, a carrier segment, and a retainer. The pair of hangers may extend radially inward from the case toward the flow path segment. The carrier segment may have a carrier segment body and a pair of carrier hooks. The carrier segment body may extend circumferentially at least partway about the axis. The pair of carrier hooks may mate with the pair of the hangers of the first mount to couple the carrier segment body to the case. The retainer may extend axially into the carrier segment body and through the first attachment so as to couple the first attachment of the flow path segment to the carrier segment body.

In some embodiments, the first attachment may include a first attachment flange and a second attachment flange. The first attachment flange may extend radially outward away from the segment wall. The second attachment flange may be spaced apart axially from the first attachment flange. The second attachment flange may extend radially outward away from the segment wall. The retainer may extend axially into the carrier segment body and through the first attachment flange and the second attachment flange of the first attachment.

These and other features of the present disclosure will become more apparent from the following description of the illustrative embodiments.

DETAILED DESCRIPTION OF THE DRAWINGS

Figure 1:
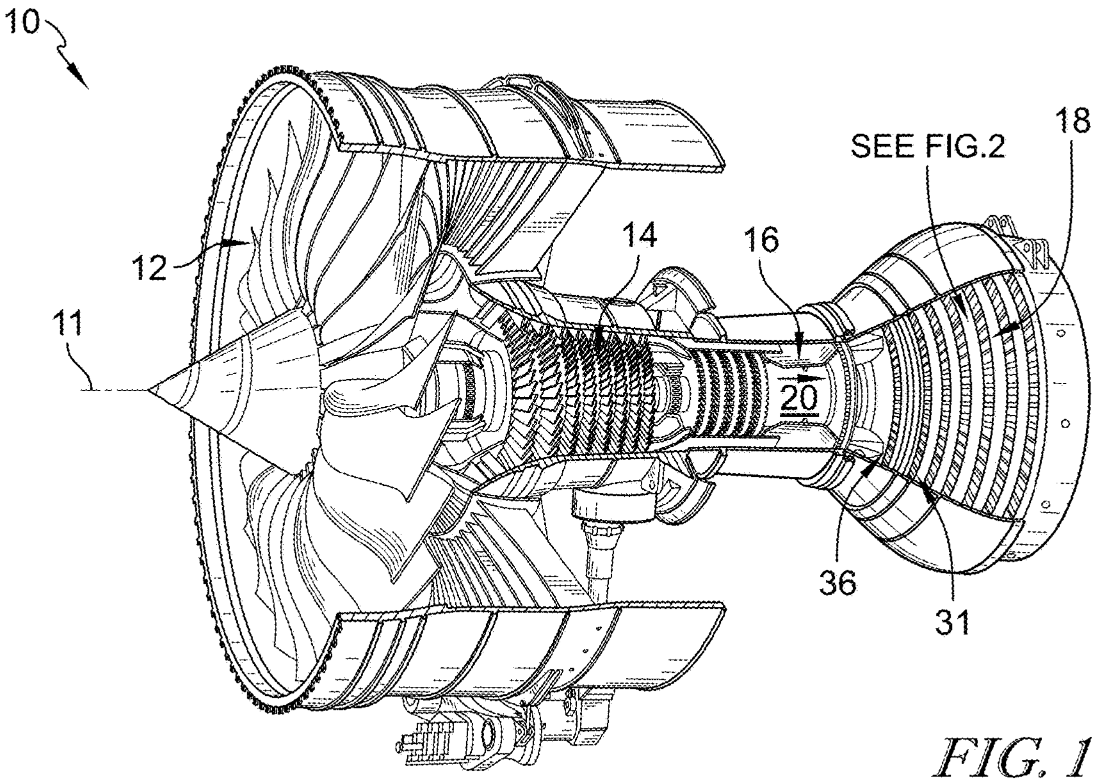
FIG. 1 is a cutaway perspective view of a gas turbine engine that includes a fan, a compressor, a combustor, and a turbine, the turbine including a turbine section comprising a case that extends circumferentially at least partway around a central axis of the gas turbine engine and a plurality of flow path components that define a primary gas path of the turbine section, such as static turbine vanes and rotating turbine blades downstream of the turbine vanes.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
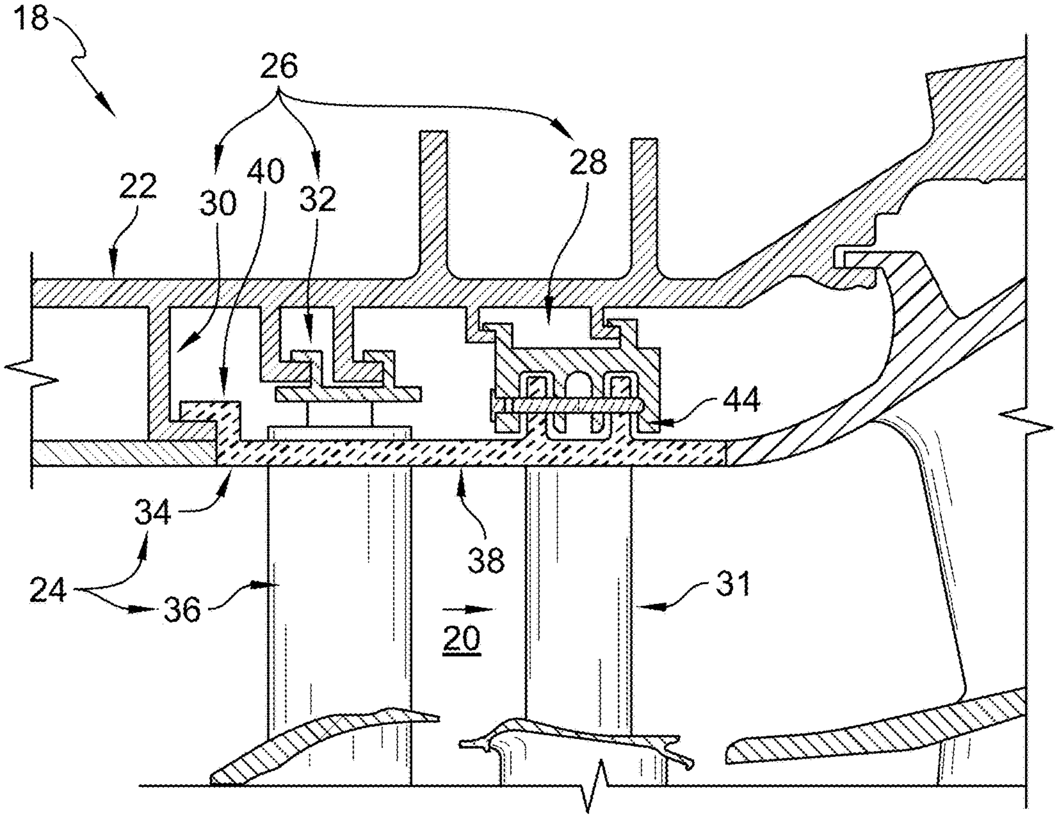
FIG. 2 is a cross-sectional view of a portion of the turbine section included in the gas turbine engine of FIG. 1 showing the plurality of flow path components further includes a flow path segment made of ceramic matrix composite materials that extends axially between a forward end located axially forward of the turbine vanes and an aft end located axially aft of the turbine blades, and further showing the turbine section further includes a mounting system configured to couple the flow path segment to the case of the turbine section so that the flow path segment shields the mounting system from hot combustion products flowing through the primary gas path during use of the gas turbine engine while accommodating differences in coefficients of thermal expansion between the ceramic matrix composite materials and metallic materials in the turbine section.
Figure 3:
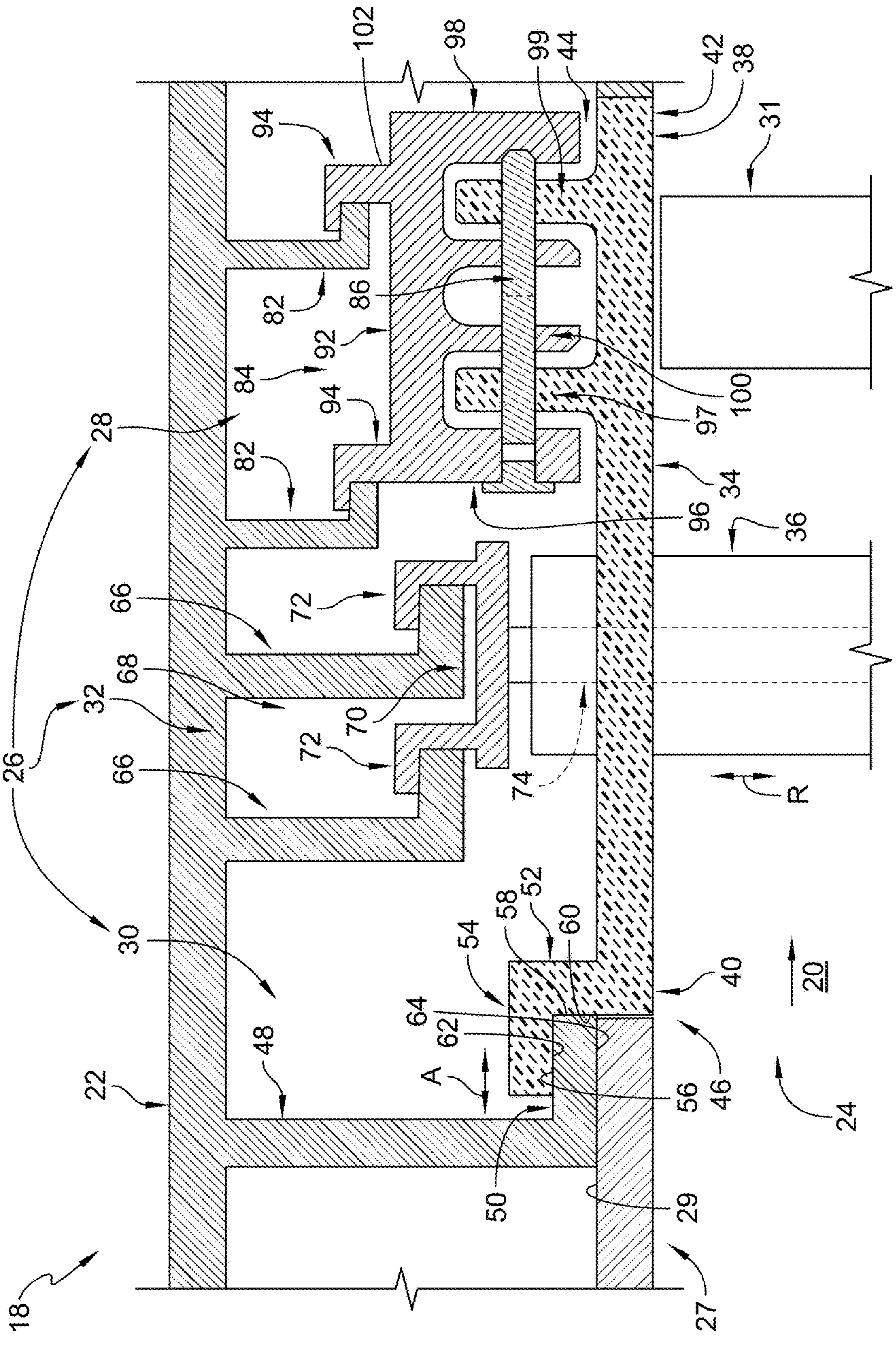
FIG. 3 is a detailed view of the turbine section of FIG. 2 showing the flow path segment includes a segment wall that extends axially between the forward and aft ends, a blade track attachment extending radially outward away from the segment wall, and a forward attachment located axially forward of the blade track attachment, and the mounting system includes a blade track mount near the aft end configured to engage the blade track attachment of the flow path segment, a forward mount near the forward end configured to engage the forward attachment of the flow path segment, and further showing the forward attachment and the forward mount are L-shaped hooks and hangers that interlock to couple the forward attachment of the flow path segment to the case.

The turbine 18 includes a case 22, a plurality of flow path components 24, and a mounting system 26 as shown in FIGS. 2 and 3. The case 22 extends circumferentially at least partway around the central axis 11 of the gas turbine engine 10. The plurality of flow path components 24 are arranged to define at least a portion of a primary gas path 20 of the turbine 18 as shown in FIG. 2. In the illustrative embodiment, the plurality of flow path components 24 include static turbine vanes 36, rotating turbine blades 31 located downstream of the turbine vanes 36, and a flow path segment 34 located radially outward of the turbine vanes 36 and the turbine blades 31 to define an outer boundary of the primary gas path 20. The mounting system 26 is configured to couple the flow path segment 34 to the case 22 to support the flow path segment 34 radially relative to the axis 11 of the gas turbine engine 10.

The flow path segment 34 is formed to include a segment wall 38, a blade track attachment 44, and a forward attachment 46 as shown in FIGS. 2 and 3. The segment wall 38 extends axially between a forward end 40 and an aft end 42 spaced apart axially from the forward end 40 to define a portion of the primary gas path 20. The forward end 40 is located axially forward of the turbine vanes 36 and the aft end 42 is located axially aft of the turbine blades 31. The blade track attachment 44 extends radially outward away from the segment wall 38 toward the case 22 near the aft end 42 of the segment wall 38. The forward attachment 46 extends radially outward away from the segment wall 38 toward the case 22 axially forward of the blade track attachment 44 near the forward end 40 of the segment wall 38. At least one of the turbine vanes 36 extends radially inward from the flow path segment 34 axially between the blade track attachment 44 and the forward attachment 46 of the flow path segment 34 in the illustrative embodiment.

The mounting system 26 includes a blade track mount 28, a forward mount 30, and a vane mount 32 as shown in FIGS. 2 and 3. The blade track mount 28 engages the blade track attachment 44 of the flow path segment 34. The forward mount 30 engages the forward attachment 46 of the flow path segment 34. The vane mount 32 engages the turbine vane 36 axially between the blade track mount 28 and the forward mount 30. The forward mount 30 is located radially outward of the primary gas path 20 so that the forward mount 30 is shielded from hot combustion products flowing through the primary gas path 20 during use of the turbine 18 in the gas turbine engine 10.

In the illustrative embodiment, the flow path segment 34 of the plurality of flow path components 24 comprises ceramic matrix composite materials, while the mounting system 26 comprises metallic materials. Ceramic matrix composite materials can generally withstand higher temperatures than metallic materials. Therefore, incorporating the ceramic matrix composite materials into the flow path segment 34 may allow for increased temperatures within the turbine 18 as well as decreased cooling air usage such that the overall efficiency of the gas turbine engine 10 can be improved. Moreover, integrating the end walls of the turbine vanes 36 and the turbine shroud into an integral, single piece component like the flow path segment 34 may reduce leakage paths along the primary gas path 20.

However, the ceramic matrix composite materials of the flow path segment 34 and the metallic materials of the mounting system 26 grow and shrink at different rates when exposed to high and low temperatures due to the differing coefficients of thermal expansion of the materials. Therefore, coupling the flow path components 24 to the mounting system 26 may be challenging.

In the illustrative embodiment, the plurality of flow path components 24 includes the flow path segment 34, the turbine vane 36, and the turbine blades 31. The flow path segment 34 includes the forward attachment 46 and the blade track attachment 44.

The mounting system 26 includes the forward mount 30, the vane mount 32, and the blade track mount 28. The ceramic matrix composite forward attachment 46 engages the metallic forward mount 30. The turbine vane 36 engages the metallic vane mount 32. The ceramic matrix composite blade track attachment 44 engages the metallic blade track mount 28. Because the ceramic matrix composite materials of the flow path segment 34 and the metallic materials of the mounting system 26 grow and shrink at different rates, the flow path segment 34 and the mounting system 26 may mate with one another in a way that allows for movement of the components relative to one another to accommodate the differing rates of thermal expansion.

Therefore, the forward attachment 46 of the flow path segment 34 and the forward mount 30 of the mounting system 26 are free for axial movement A relative to the each other as suggested in FIG. 3. The forward attachment 46 and the forward mount 30 are free for axial movement A relative to each other, or in other words are able to slide relative to each other as indicated by arrow A, to accommodate different rates of thermal expansion experienced by the ceramic matrix composite materials of the flow path segment 34 and the metallic materials of the mounting system 26. The blade track attachment 44 includes a pair of attachment flanges 97, 99 that are pinned to the blade track mount 28 in the illustrative embodiment.

In the illustrative embodiment, the forward mount 30 of the mounting system 26 is a hanger 26 and the forward attachment 46 of the flow path segment 34 is a hook 34 as shown in FIGS. 2 and 3. Both the hanger 26 and the hook 34 form L-shapes. The forward mount 30 includes a radially-extending mount portion 48 that extends radially inward from the case 22 toward the primary gas path 20 and an axially-extending mount portion 50 that extends axially aft from the radially-extending mount portion 48 to form the L-shaped hanger. The forward attachment 46 of the flow path segment 34 includes a radially-extending attachment portion 52 that extends radially outward from the segment wall 38 of the flow path segment 34 at the forward end 40 of the segment wall 38 and an axially-extending attachment portion 54 that extends axially forward from the radially-extending attachment portion 52 away from the vane mount 32 to form the L-shaped hook that mates with the L-shaped hanger of the forward mount 30.

The L-shaped hook of the forward attachment 46 is an upside-down L (e.g., an L shape that has been turned 180 degrees). The L-shaped hanger of the forward mount 30 mates with the upside-down L-shaped hook of the forward attachment 46 of the mounting system 26. This engagement allows for differences in thermal growth due to the different coefficients of thermal expansion of the metallic materials of the mounting system 26 and the ceramic matrix composite materials of the flow path segment 34. For example, the metallic forward mount 30 may grow and shrink based on the temperature and the forward attachment 46 is not fixed in the axial direction to accommodate said growing and shrinking.

As shown in FIG. 3, the forward mount 30, also referred to as a second mount, of the mounting system 26 is located axially forward of the vane mount 32 and the blade track mount 28. The forward mount 30 includes the radially-extending mount portion 48 that extends away from the case 22 and the axially-extending mount portion 50 that extends from the radially-extending mount portion 48 toward the turbine vane 36. The axially-extending mount portion 50 defines a first mount face 56, a second mount face 58 perpendicular to the first mount face 56, and a third mount face 64 parallel to the first mount face 56. The first mount face 56 faces toward the case 22. The second mount face 58 faces toward the turbine vane 36. The third mount face 64 faces away from the case 22.

The forward attachment 46, also known as a second attachment, of the flow path segment 34 is located axially forward of the turbine vane 36 and the blade track attachment 44 as shown in FIG. 3. The forward attachment 46 includes the radially-extending attachment portion 52 that extends away from the segment wall 38 toward the case 22 and the axially-extending attachment portion 54 that extends from the radially-extending attachment portion 52 away from the turbine vane 36. The radially-extending attachment portion 52 defines a first attachment face 60 that faces away from the turbine vane 36. The axially-extending attachment portion 54 defines a second attachment face 62 that faces away from the case 22.

The first mount face 56 of the forward mount 30 engages the second attachment face 62 of the forward attachment 46, while the second mount face 58 of the forward mount 30 engages the first attachment face 60 of the forward attachment 46 as shown in FIG. 3. The forward mount 30 and the forward attachment 46 are free for axial movement A such that the forward mount 30 and the forward attachment 46 may slide along the engagement of the first mount face 56 of the forward mount 30 and the second attachment face 62 of the forward attachment 46.

In the illustrative embodiment, the combustor 16 of the gas turbine engine 10 includes a combustor liner 27. One end of the combustor liner 27 is adjacent to the forward end 40 of the segment wall 38. The combustor liner 27 is located radially inward of the forward mount 30. The combustor liner 27 extends axially along the forward mount 30 so as to shield the forward mount 30 from the primary gas path 20.

The combustor liner 27 is radially aligned with the segment wall 38 such that the combustor liner 27 shields the forward mount 30 from the primary gas path 20. The third mount face 64 of the forward mount 30 engages a top surface 29 of the combustor liner 27. The combustor liner 27 helps shield the forward mount 30 from hot combustion products flowing through the primary gas path 20. Shielding the metallic forward mount 30 from the primary gas path 20 allows for the temperature within the turbine 18 to be hotter as the metallic forward mount 30 is not in the direct flow path of the hot combustion products flowing through the primary gas path 20.

The vane mount 32, also referred to as a third mount, of the mounting system 26 is located axially between the forward mount 30 and the blade track mount 28 as shown in FIG. 3. The vane mount 32 includes a pair of vane mount hangers 66 and a vane support 68. Each hanger 66 of the pair of vane mount hangers 66 forms an L-shaped hanger similar to the L-shaped hanger of the forward mount 30. The vane support 68 couples to the vane mount hangers 66 and extends radially inward away from the case 22.

The vane support 68 includes a carrier 70 formed with carrier hooks 72 that mate with the vane mount hangers 66 of the vane mount 32 and a support spar 74 that extends radially through the turbine vane 36 as shown in FIG. 3. The carrier 70 is located radially outward of the turbine vane 36 and couples to the vane mount hangers 66. The carrier hooks 72 extend radially outward from the carrier 70 and are L-shaped hooks similar to the forward attachment 46 of the flow path segment 34. The support spar 74 extends radially inward form the carrier 70 through the flow path segment 34 and the turbine vane 36.

In the illustrative embodiments, there is a seal (not shown) located between the turbine vane 36 and the flow path segment 34. In the illustrative embodiments, the turbine vane 36 and the turbine blade 31 may be made of ceramic matrix composite materials. In illustrative embodiments, the turbine vane 36 is a hollow shell and the support spar 74 extends through the hollow shell.

Each L-shaped hanger 66 of the pair of vane mount hangers 66 mates with a corresponding L-shaped hook 72 of the pair of the carrier hook 72 of the vane support 68 to couple the vane support 68 to the case 22 as shown in FIG. 3. The turbine vane 36 may transfer some aerodynamic loads to the support spar 74 of the vane support 68 in the illustrative embodiment.

In the illustrative embodiment, the turbine vane 36, also referred to as the heat shield, is a separate component from the flow path segment 34. The turbine vane 36 extends through the segment wall 38 of the flow path segment 34. The flow path segment 34 and the turbine vane 36 are free for radial movement R relative to each other to accommodate differing coefficients in thermal expansion between the metallic materials of the vane mount 32 and the ceramic matrix composite materials of the flow path segment 34.

The blade track mount 28, also known as a first mount, of the mounting system 26 is located axially aft of the vane mount 32 as shown in FIG. 3. The blade track mount 28 includes a pair of blade track hangers 82, a carrier segment 84, and a retainer 86 as shown in FIG. 3. The pair of blade track hangers 82 extend radially inward from the case 22 toward the segment wall 38. The pair of blade track hangers 82 each form an L-shaped hanger similar to the forward mount 30 and the vane mount hangers 66 of the vane mount 32. The carrier segment 84 includes a carrier segment body 92 that extends circumferentially at least partway about the axis 11 and a pair of carrier hooks 94 that extends radially outward from the carrier segment body 92 toward the case 22. Each carrier hook 94 forms an L-shaped hook similar to the forward attachment 46 and the carrier hooks 72 of the vane support 68.

Each L-shaped hanger 82 of the pair of blade track hangers 82 mates with a corresponding L-shaped hook 94 of the pair of carrier hooks 94 to couple the carrier segment body 92 to the case 22. The engagement of the pair of blade track hangers 82 and the pair of carrier hooks 94 couples the blade track mount 28, and thus, the case 22, to the carrier segment body 92. The retainer 86 extends axially into the carrier segment body 92 and through the blade track attachment 44 so as to couple the blade track attachment 44 of the flow path segment 34 to the carrier segment body 92.

In the illustrative embodiment, the carrier segment body 92 includes a plurality of mount flanges 96, 98, 100, 102 as shown in FIG. 3 radially inward from the carrier segment body 92. The plurality of mount flanges 96, 98, 100, 102 are each formed to include corresponding holes that receive the retainer 86 when the retainer 86 is inserted into the carrier segment 84 and through the blade track attachment 44.

In the illustrative embodiment, the first mount flange 96 is located at an axially forward end of the carrier segment body 92 and the second mount flange 98 is located at an axially aft end of the carrier segment body 92 as shown in FIG. 3. The third mount flange 100 is spaced apart from and located axially aft of the first mount flange 96. The fourth mount flange 102 is spaced apart from and located axially aft of the third mount flange 100. The fourth mount flange 102 is located axially forward of the second mount flange 98. The third and fourth mount flanges 100, 102 are both located axially inward of the first mount flange 96 and the second mount flange 98.

The blade track attachment 44, also known as a first attachment, of the flow path segment 34 is located axially aft of the turbine vane 36 as shown in FIG. 3. The blade track attachment 44 includes a first attachment flange 97 and a second attachment flange 99. The first attachment flange 97 and the second attachment flange 99 extend radially outward away from the segment wall 38 of the flow path segment 34 and toward the case 22. The second attachment flange 99 is spaced apart from and located axially aft of the first attachment flange 97.

In the illustrative embodiment, the first attachment flange 97 is located axially between the first mount flange 96 of the carrier segment 84 and the third mount flange 100 of the carrier segment 84. The second attachment flange 99 is located axially between the fourth mount flange 102 of the carrier segment 84 and the second mount flange 98 of the carrier segment 84. The first attachment flange 97 and the second attachment flange 99 of the blade track attachment 44 are each formed to include corresponding holes that receive the retainer 86 when the retainer 86 is inserted into the carrier segment 84 and through the blade track attachment 44.

The retainer 86 is configured to couple the blade track attachment 44, and thus, the flow path segment 34, to the carrier segment 84 as shown in FIG. 3. The retainer 86 extends axially through the first mount flange 96 of the carrier segment 84, the first attachment flange 97 of the blade track attachment 44, the third mount flange 100 of the carrier segment 84, the fourth mount flange 102 of the carrier segment 84, the second attachment flange 99 of the blade track attachment 44, and into the second mount flange 98 of the carrier segment 84. In one embodiment, the retainer 86 is formed as a single pin as shown in FIGS. 2 and 3. The retainer 86 may have a circular cross-section, or may have any other suitable cross-section.

In another embodiment, the retainer 86 includes two pins, a forward pin and an aft pin as suggested in FIG. 3. The forward pin and the aft pin are circumferentially aligned. The forward pin is located axially forward of the aft pin. In this embodiment, the forward pin is separate from the aft pin so as to allow for independent loading during use in the gas turbine engine 10.

In the illustrative embodiments, the case 22 is a single, integral piece. In some embodiments, the case 22 may comprise multiple sections that are fastened together to form the case 22. For example, the case 22 may comprise a first section forming a combustor case and a second section forming a HP-IP turbine case. Alternatively, the case 22 may comprise a first section forming a combustor-HP case and a second section forming an IP turbine case. The different parts of the mounting system 26 may extend from different sections of the case 20 if the case 20 is formed from multiple pieces fastened together A method of assembling the turbine section 18 may include several steps. The method may begin with assembling the carrier segment 84 with the flow path segment 34. To assemble the carrier segment 84 with the flow path segment 34, the carrier segment 84 is arranged adjacent to the blade track attachment 44 so that the first attachment flange 97 extends between the first mount flange 96 and the third mount flange 100 and the second attachment flange 99 extends between the second mount flange 98 and the fourth mount flange 102. In this way, the retainer 86 may be inserted through the carrier segment 84 and the blade track attachment 44.

Before or after the carrier segment 84 is coupled to the blade track attachment 44, the turbine vane 36 and the vane support 68 are assembled with the flow path segment 34. Next, the assembled components are arranged within the case 22. The assembled components are arranged so that the blade track hangers 82 engage the carrier hooks 94, the carrier hooks 72 engage the vane mount hangers 66, and the forward attachment 46 engages the forward mount 30. In other words, the L-shaped hook of the forward attachment 46 mates with the L-shaped hanger of the forward mount 30.

Figure 4:
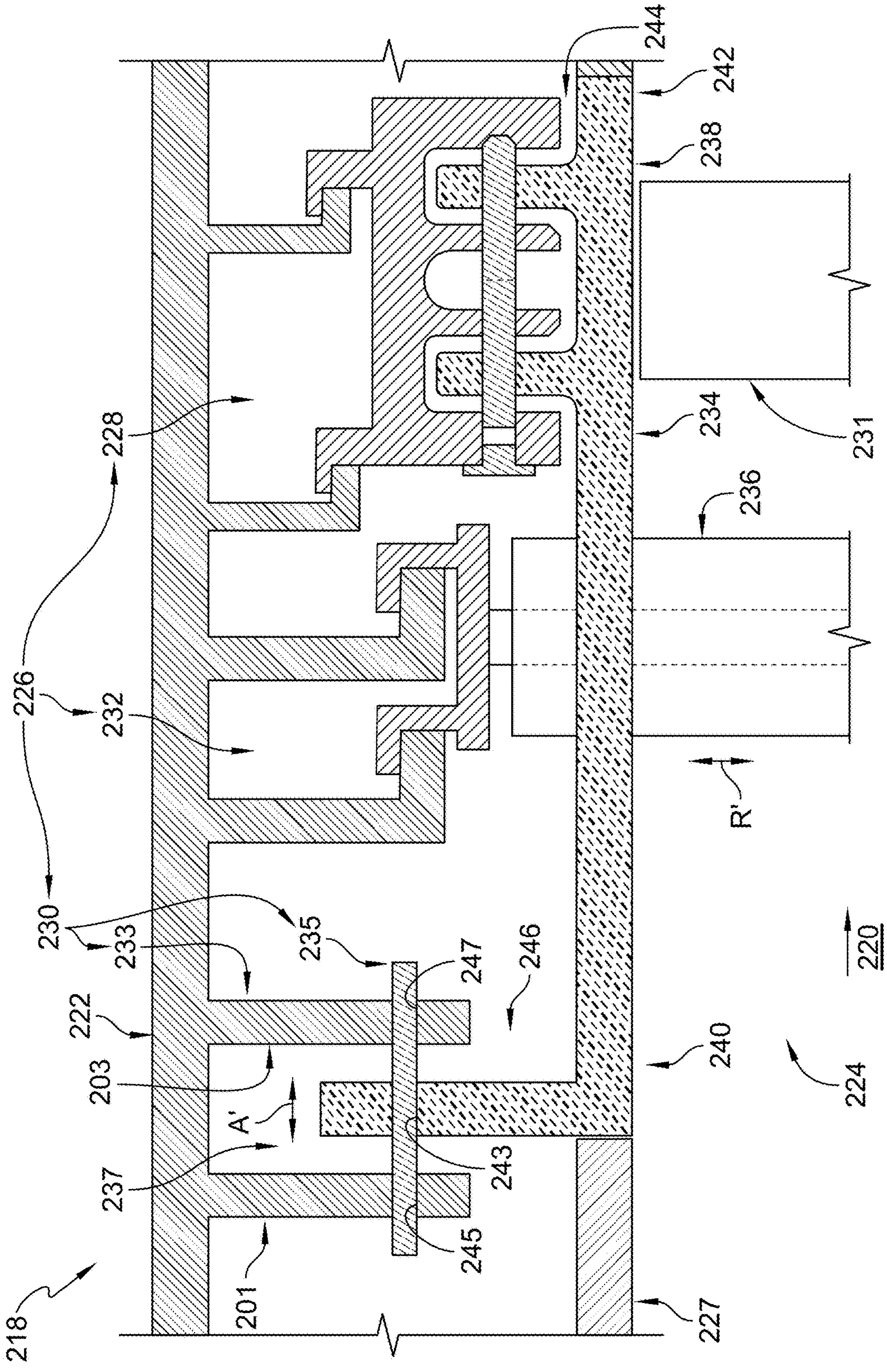
FIG. 4 is a detailed view of another embodiment of a turbine section adapted for use in the gas turbine engine of FIG. 1 showing the turbine section includes a flow path segment having a segment wall, a blade track attachment, and a forward attachment and a mounting system that includes a forward mount defined by a clevis that extends radially inward from the case toward the primary gas path and a forward mount pin, and further showing the clevis is shaped to define a forward attachment receiving space that receives the forward attachment of the flow path segment and the forward mount pin extends axially through the clevis into the forward attachment so as to couple the forward attachment to the case.

Another embodiment of a turbine 218 in accordance with the present disclosure is shown in FIG. 4. The turbine 218 is substantially similar to the turbine 18 shown in FIGS. 2 and 3 and described herein. Accordingly, similar reference numbers in the 200 series indicate features that are common between the turbine 18 and the turbine 218. The description of the turbine 18 is incorporated by reference to apply to the turbine 218, except in instances when it conflicts with the specific description and the drawings of the turbine 218.

The turbine 218 includes a case 222, a plurality of flow path components 224, and a mounting system 226 as shown in FIG. 4. The mounting system 226 is configured to couple the plurality of flow path components 224 to the case 222.

The plurality of flow path components 224 includes a flow path segment 234, a turbine vane 236, and a turbine blade 231 as shown in FIG. 4. The flow path segment 234 is formed to include a segment wall 238, a blade track attachment 244, and a forward attachment 246.

The segment wall 238 extends axially between a forward end 240 and an aft end 242 spaced apart axially from the forward end 240 to define a portion of the primary gas path 220 as shown in FIG. 4.

The forward attachment 246 of the flow path segment 234 is located axially forward of the turbine vane 236 as shown in FIG. 4. The forward attachment 246 extends radially outward from the segment wall 238 toward the case 222. The forward attachment 246 is formed to include an attachment hole 243.

The mounting system 226 includes a blade track mount 228, a forward mount 230, and a vane mount 232 as shown in FIG. 4. The forward mount 230 of the mounting system 226 includes a clevis 233 and a forward mount pin 235.

The clevis 233 of the forward mount 230 extends radially inward from the case 222 toward the primary gas path 220 as shown in FIG. 4. The clevis 233 includes a first clevis flange 201 and a second clevis flange 203. The first clevis flange 201 is located axially forward of the second clevis flange 203. The first clevis flange 201 is formed to include a first clevis hole 245. The second clevis flange 203 is formed to include a second clevis hole 247. The first clevis flange 201 and the second clevis flange 203 of the clevis 233 cooperate to form a forward attachment receiving space 237, also known as a second attachment receiving space, for receiving the forward attachment 246. The forward attachment 246 extends into the forward attachment receiving space 237 such that the forward attachment 246 is located axially between the first clevis flange 201 and the second clevis flange 203.

The forward mount pin 235, also referred to as a second mount pin, is configured to extend axially through the clevis 233 and the forward attachment 246 so as to couple the forward mount 230 to the forward attachment 246 as shown in FIG. 4. The forward mount pin 235 extends through the first clevis hole 245 of the first clevis flange 201, the attachment hole 243 of the forward attachment 246, and through the second clevis hole 247 of the second clevis flange 203. Because the forward mount pin 235 couples the clevis 233 to the forward attachment 246, the metallic forward mount 230 may grow and shrink based on the temperature, and the forward attachment 246 and the forward mount 230 are free for axial movement A' relative to each other to accommodate said growing and shrinking.

In the illustrative embodiment, the forward end 240 of the segment wall 238 aligns with a combustor liner 227 included in a combustor 216 of a gas turbine engine 210. One end of the combustor liner 227 is adjacent to the forward end 240 of the segment wall 238. The combustor liner 227 is located radially inward of the forward mount 230 so as to shield the forward mount 230 from the primary gas path 220. The combustor liner 227 is radially aligned with the segment wall 238 such that the combustor liner 227 shields the forward mount 230 from hot combustion products flowing through the primary gas path 220.

A method of assembling the turbine section 218 may include several steps. To arrange the assembled components within the case 222, the assembled components are arranged so that the forward attachment 246 engages the forward mount 230. In other words, the forward attachment 246 extends into the forward attachment receiving space 237 between the clevis flanges 201, 203. The forward mount pin 235 is then inserted through the first clevis flange 201, the forward attachment 246, and the second clevis flange 203.

Figure 5:
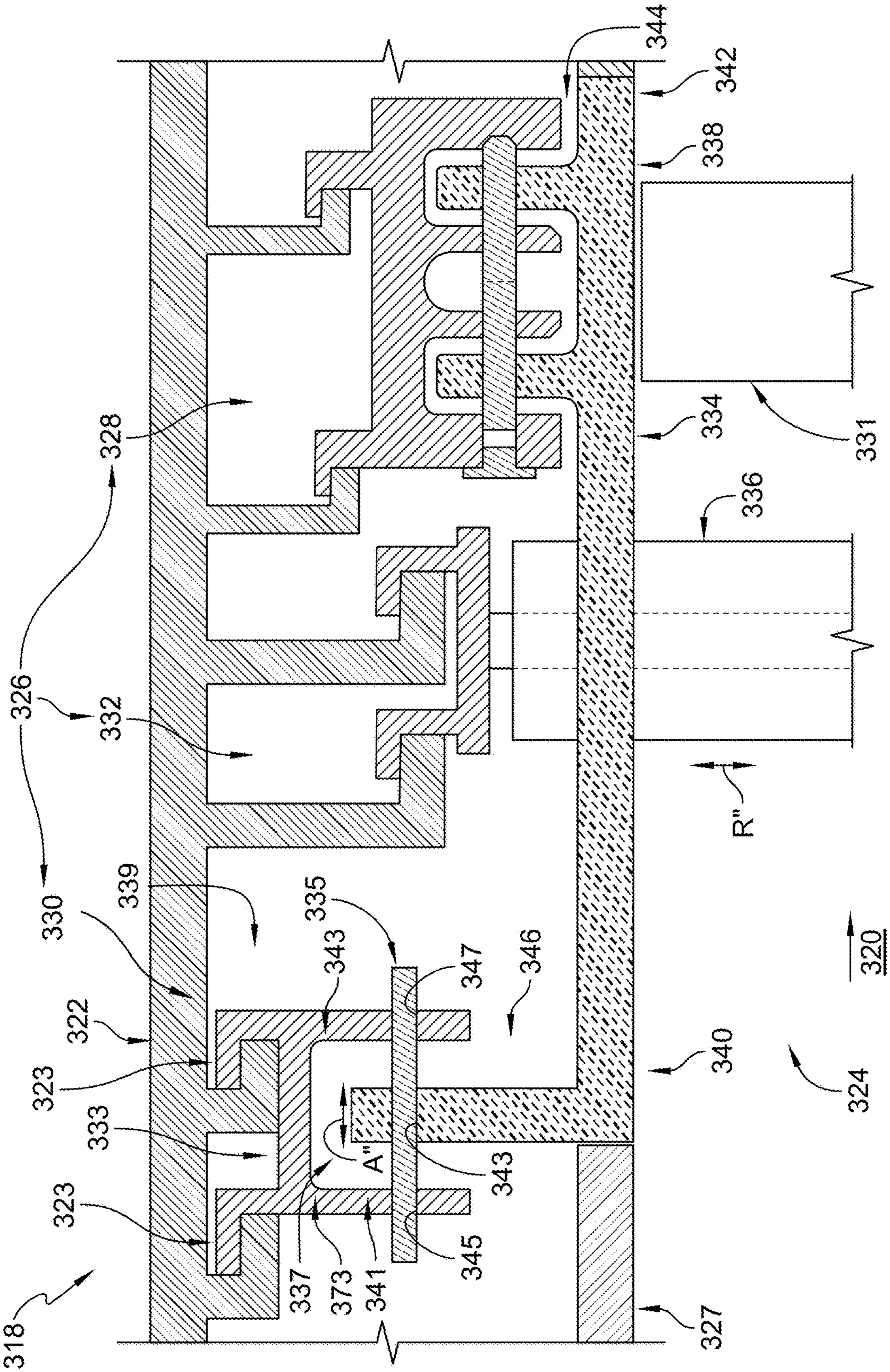
FIG. 5 is a detailed view of another embodiment of a turbine section adapted for use in the gas turbine engine of FIG. 1 showing the turbine section includes a flow path segment having a segment wall, a blade track attachment, and a forward attachment, and a mounting system that includes a forward mount including L-shaped hangers that extend radially inward from the case toward the primary gas path, a forward carrier segment, and a forward mount pin, and further showing the forward carrier segment includes carrier hooks that interlock with the L-shaped hangers of the forward mount and the forward mount pin extends axially through the forward carrier segment into the forward attachment so as to couple the forward attachment to the case.

Another embodiment of a turbine 318 in accordance with the present disclosure is shown in FIG. 5. The turbine 318 is substantially similar to the turbines 18, 218 shown in FIGS. 1-4 and described herein. Accordingly, similar reference numbers in the 300 series indicate features that are common between the turbine 18, 218 and the turbine 318. The description of the turbine 18 and the turbine 218 are incorporated by reference to apply to the turbine 318, except in instances when it conflicts with the specific description and the drawings of the turbine 318.

The turbine 318 includes a case 322, a plurality of flow path components 324, and a mounting system 326 as shown in FIG. 5. The mounting system 326 is configured to couple the plurality of flow path components 324 to the case 322.

The plurality of flow path components 324 includes a flow path segment 334, a turbine vane 336, and a turbine blade 331 as shown in FIG. 5. The flow path segment 334 is formed to include a segment wall 338, a blade track attachment 344, and a forward attachment 346.

The segment wall 338 extends axially between a forward end 340 and an aft end 342 and a forward end 340. The aft end 342 is spaced apart axially from the forward end 340 to define a portion of the primary gas path 320 as shown in FIG. 5.

The forward attachment 346 of the flow path segment 334 is located axially forward of the turbine vane 336 as shown in FIG. 5. The forward attachment 346 extends radially outward from the segment wall 338 toward the case 322. The forward attachment 346 is formed to include an attachment hole 343.

The mounting system 326 includes a blade track mount 328, a forward mount 330, and a vane mount 332 as shown in FIG. 5. The forward mount 330 of the mounting system 326 includes L-shaped hangers 323, a forward carrier segment 333, and a forward mount pin 335. The forward carrier segment 333 extends circumferentially at least part way about the axis 11.

The L-shaped hangers 323 of the forward mount 330 extend radially inward from the case 322 toward the primary gas path 320 and axially aft toward the turbine vane 336 as shown in FIG. 5. The forward carrier segment 333 includes a body 373, L-shaped hooks 339, a first flange 341, and a second flange 343 as shown in FIG. 5. The L-shaped hooks 339 extend radially outward from the body 373 toward the case 322 and axially forward away from the turbine vane 336. The L-shaped hooks 339 mate with the L-shaped hangers 323 to couple the forward carrier segment 333 to the case 322. The first flange 341 and the second flange 343 extend radially inward from the body 373 toward the segment wall 338. The first flange 341 is located axially forward of the second flange 343. The first flange 341 is formed to include a first flange hole 345. The second flange 343 is formed to include a second flange hole 347.

In the illustrative embodiment, the body 373 and the flanges 341, 343 form a clevis as shown in FIG. 5. The first flange 341 and the second flange 343 cooperate to form a forward attachment receiving space 337 for receiving the forward attachment 346. The forward attachment 346 extends into the forward attachment receiving space 337 such that the forward attachment 346 is located axially between the first flange 341 and the second flange 343.

The forward mount pin 335 is configured to extend axially through the first flange 341, the forward attachment 346, and the second flange 343 so as to couple the forward mount 330 to the forward attachment 346 as shown in FIG. 5. The forward mount pin 335 extends through the first flange hole 345 of the first flange 341, through the attachment hole 343 of the forward attachment 346, and through the second flange hole 347 of the second flange 343. Because the forward mount pin 335 couples the forward carrier segment 333 to the forward attachment 346, the metallic forward mount 330 may grow and shrink based on the temperature, and the forward attachment 346 and the forward mount 330 are free for axial movement A" relative to each other to accommodate said growing and shrinking.

A method of assembling the turbine section 318 may include several steps. To arrange the assembled components within the case 322, the assembled components are arranged so that the forward attachment 346 engages the forward mount 330. In other words, the forward attachment 346 extends into the forward attachment receiving space 337 between the flanges 341, 343. The forward mount pin 335 is then inserted through the flange 341, the forward attachment 346, and the flange 343. Next, the hooks 339 are engaged with the hangers 323 of the forward mount 330.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine section for use with a gas turbine engine, the turbine section comprising:

a case that extends circumferentially at least partway around an axis of the gas turbine engine, a plurality of flow path components arranged to define a primary gas path of the turbine section, the plurality of flow path components including a turbine vane, a turbine blade located axially aft of the turbine vane and configured to rotate about the axis of the gas turbine engine, and a flow path segment made of ceramic matrix composite materials and formed to include a segment wall that extends axially between a forward end located axially forward of the turbine vane and an aft end spaced apart axially from the forward end and located axially aft of the turbine blade to define a portion of the primary gas path, a blade track attachment that extends radially outward away from the segment wall and toward the case near the aft end of the segment wall, and a forward attachment spaced apart from the blade track attachment and located axially forward of the blade track attachment near the forward end, and the turbine vane extending radially inward from the flow path segment axially between the blade track attachment and the forward attachment of the flow path segment, and a mounting system made of metallic materials and configured to couple the flow path segment to the case to support the flow path segment radially relative to the axis of the gas turbine engine, the mounting system including a blade track mount that engages the blade track attachment of the flow path segment, a forward mount that engages the forward attachment of the flow path segment, and a vane mount that engages the turbine vane axially between the blade track mount and the forward mount, wherein the forward mount is located radially outward of the primary gas path so that the forward mount is shielded from hot combustion products flowing through the primary gas path during use of the turbine section in the gas turbine engine, wherein the forward attachment and the forward mount are free for axial movement relative to each other to accommodate different rates of thermal expansion experienced by the ceramic matrix composite materials of the flow path segment and the metallic materials of the mounting system, and wherein the flow path segment and the turbine vane are free for radial movement relative to each other to accommodate different rates of thermal expansion experienced by the ceramic matrix composite materials of the flow path segment and the metallic materials of the mounting system.

2. The turbine section of claim 1, wherein the forward end of the segment wall of the flow path segment is located adjacent to a combustor liner included in the gas turbine engine and the combustor liner is located radially inward of the forward mount so that the forward mount is shielded from hot combustion products flowing through the primary gas path.

3. The turbine section of claim 1, wherein the forward mount of the mounting system includes a radially-extending mount portion that extends radially inward from the case toward the primary gas path and an axially-extending mount portion that extends axially aft from the radially-extending mount portion to form an L-shaped hanger.

4. The turbine section of claim 3, wherein the forward attachment of the flow path segment includes a radially-extending attachment portion that extends radially outward from the segment wall of the flow path segment at the forward end of the segment wall and an axially-extending attachment portion that extends axially forward from the radially-extending attachment portion away to form an L-shaped hook that mates with the L-shaped hanger of the forward mount of the mounting system to couple the flow path segment to the case.

5. The turbine section of claim 1, wherein the forward mount of the mounting system includes a clevis that extends radially inward from the case toward the primary gas path and a forward mount pin, the clevis shaped to define a forward attachment receiving space that receives the forward attachment of the flow path segment, and the forward mount pin is configured to extend axially through the clevis into the forward attachment so as to couple the forward mount to the forward attachment.

6. The turbine section of claim 1, wherein the forward mount of the mounting system includes a pair of hangers extending radially inward from the case toward the flow path segment and axially aft toward the turbine vane, a forward carrier segment having an forward carrier segment body that extends circumferentially at least partway about the axis and a pair of attachment hooks that mate with the pair of hangers to couple the forward carrier segment to the case, and a forward mount pin that extends axially into the forward carrier segment body and through the forward attachment so as to couple the forward mount to the forward attachment.

7. The turbine section of claim 1, wherein the blade track mount includes a pair of hangers extending radially inward from the case toward the flow path segment, a carrier segment having a carrier segment body that extends circumferentially at least partway about the axis and a pair of carrier hooks that mate with the pair of hangers of the blade track mount to couple the carrier segment body to the case, and a retainer that extends axially into the carrier segment body and through the blade track attachment so as to couple the blade track attachment of the flow path segment to the carrier segment body.

8. A turbine section for use with a gas turbine engine, the turbine section comprising:

a case that extends circumferentially at least partway around an axis of the gas turbine engine, a plurality of flow path components arranged to define a primary gas path of the turbine section, the plurality of flow path components including a turbine vane, a turbine blade located axially aft of the turbine vane and configured to rotate about the axis of the gas turbine engine, and a flow path segment made of ceramic matrix composite materials and formed to include a segment wall that extends axially between a forward end located axially forward of the turbine vane and an aft end spaced apart axially from the forward end and located axially aft of the turbine blade to define a portion of the primary gas path, a blade track attachment that extends radially outward away from the segment wall and toward the case near the aft end of the segment wall, and a forward attachment spaced apart from the blade track attachment and located axially forward of the blade track attachment near the forward end, and the turbine vane extending radially inward from the flow path segment axially between the blade track attachment and the forward attachment of the flow path segment, and a mounting system made of metallic materials and configured to couple the flow path segment to the case to support the flow path segment radially relative to the axis of the gas turbine engine, the mounting system including a blade track mount that engages the blade track attachment of the flow path segment, a forward mount that engages the forward attachment of the flow path segment, and a vane mount that engages the turbine vane axially between the blade track mount and the forward mount, wherein the forward mount is located radially outward of the primary gas path so that the forward mount is shielded from hot combustion products flowing through the primary gas path during use of the turbine section in the gas turbine engine, wherein the blade track mount includes a pair of hangers extending radially inward from the case toward the flow path segment, a carrier segment having a carrier segment body that extends circumferentially at least partway about the axis and a pair of carrier hooks that mate with the pair of hangers of the blade track mount to couple the carrier segment body to the case, and a retainer that extends axially into the carrier segment body and through the blade track attachment so as to couple the blade track attachment of the flow path segment to the carrier segment body, and wherein the blade track attachment includes a first attachment flange that extends radially outward away from the segment wall and a second attachment flange spaced apart axially from the first attachment flange that extends radially outward away from the segment wall, wherein the retainer extends axially into the carrier segment body and through the first attachment flange and the second attachment flange of the blade track attachment.

9. The turbine section of claim 1, wherein the forward mount of the mounting system includes a radially-extending mount portion that extends radially inward from the case toward the primary gas path and an axially-extending mount portion that extends axially aft from the radially-extending mount portion to form an L-shaped hanger, and wherein the forward attachment includes a radially-extending attachment portion that extends radially outward from the segment wall of the flow path segment at the forward end of the segment wall and an axially-extending attachment portion that extends axially forward from the radially-extending attachment portion away to form an L-shaped hook that mates with the L-shaped hanger of the forward mount of the mounting system to couple the flow path segment to the case.

10. The turbine section of claim 1, wherein the forward mount of the mounting system includes a clevis that extends radially inward from the case toward the primary gas path and a forward mount pin, the clevis shaped to define a forward attachment receiving space that receives the forward attachment of the flow path segment, and the forward mount pin configured to extend axially through the clevis into the forward attachment so as to couple the forward mount to the forward attachment.

11. A turbine section for use with a gas turbine engine, the turbine section comprising:

a case that extends circumferentially at least partway around an axis of the gas turbine engine, a flow path segment made of ceramic matrix composite materials and arranged to define a primary gas path of the turbine section, the flow path segment including a segment wall that extends axially between a forward end and an aft end spaced apart from the forward end to define a portion of the primary gas path, a first attachment that extends radially outward away from the segment wall and toward the case, and a second attachment located axially forward of the first attachment, and a mounting system made of metallic materials and configured to couple the flow path segment to the case to support the flow path segment radially relative to the axis, the mounting system including a first mount configured to engage the first attachment of the flow path segment and a second mount located axially forward of the first attachment and configured to engage the second attachment of the flow path segment, wherein the second mount is located radially outward of the primary gas path so that the second mount is shielded from hot combustion products flowing through the primary gas path during use of the turbine section in the gas turbine engine and the second attachment and the second mount are free for axial movement relative to each other to accommodate different rates of thermal expansion experienced by the ceramic matrix composite materials of the flow path segment and the metallic materials of the mounting system, wherein the turbine section further comprises a turbine vane that extends radially inward from the flow path segment axially between the first and second attachments of the flow path segment, and wherein the mounting system further includes a third mount located axially between the first and second mounts of the mounting system and configured to engage the turbine vane, and wherein the flow path segment and the turbine vane are free for radial movement relative to each other to accommodate different rates of thermal expansion experienced by the ceramic matrix composite materials of the flow path segment and the metallic materials of the mounting system.

12. The turbine section of claim 11, wherein the second mount of the mounting system includes a pair of hangers extending radially inward from the case toward the flow path segment, a carrier segment having a carrier segment body that extends circumferentially at least partway about the axis and a pair of attachment hooks that mate with the pair of hangers to couple the carrier segment to the case, and a second mount pin that extends axially into the carrier segment body and through the second attachment so as to couple the second attachment of the flow path segment to the carrier segment of the second mount.

13. The turbine section of claim 11, wherein the second mount of the mounting system includes a radially-extending mount portion that extends radially inward from the case toward the primary gas path and an axially-extending mount portion that extends axially aft from the radially-extending mount portion to form an L-shaped hanger, and wherein the second attachment includes a radially-extending attachment portion that extends radially outward from the segment wall of the flow path segment at the forward end of the segment wall and an axially-extending attachment portion that extends axially forward from the radially-extending attachment portion away to form an L-shaped hook that mates with the L-shaped hanger of the second mount of the mounting system to couple the flow path segment to the case.

14. The turbine section of claim 11, wherein the second mount of the mounting system includes a clevis that extends radially inward from the case toward the primary gas path and a second mount pin, the clevis shaped to define a second attachment receiving space that receives the second attachment of the flow path segment, and the second mount pin is configured to extend axially through the clevis into the second attachment so as to couple the second mount to the second attachment.

15. The turbine section of claim 11, wherein the first mount includes a pair of hangers extending radially inward from the case toward the flow path segment, a carrier segment having a carrier segment body that extends circumferentially at least partway about the axis and a pair of carrier hooks that mate with the pair of hangers of the first mount to couple the carrier segment body to the case, and a retainer that extends axially into the carrier segment body and through the first attachment so as to couple the first attachment of the flow path segment to the carrier segment body.

16. The turbine section of claim 15, wherein the first attachment includes a first attachment flange that extends radially outward away from the segment wall and a second attachment flange spaced apart axially from the first attachment flange that extends radially outward away from the segment wall, wherein the retainer extends axially into the carrier segment body and through the first attachment flange and the second attachment flange of the first attachment.

17. The turbine section of claim 7, wherein the blade track attachment includes a first attachment flange that extends radially outward away from the segment wall and a second attachment flange spaced apart axially from the first attachment flange that extends radially outward away from the segment wall, wherein the retainer extends axially into the carrier segment body and through the first attachment flange and the second attachment flange of the blade track attachment.

18. The turbine section of claim 8, wherein the forward mount of the mounting system includes a radially-extending mount portion that extends radially inward from the case toward the primary gas path and an axially-extending mount portion that extends axially aft from the radially-extending mount portion to form an L-shaped hanger.

19. The turbine section of claim 18, wherein the forward attachment of the flow path segment includes a radially-extending attachment portion that extends radially outward from the segment wall of the flow path segment at the forward end of the segment wall and an axially-extending attachment portion that extends axially forward from the radially-extending attachment portion away to form an L-shaped hook that mates with the L-shaped hanger of the forward mount of the mounting system to couple the flow path segment to the case.

* * * * *